(12) United States Patent
Seeliger et al.

(10) Patent No.: US 6,206,460 B1
(45) Date of Patent: Mar. 27, 2001

(54) MOTOR VEHICLE WITH VIBRATION DAMPER

(75) Inventors: Hans-Wolfgang Seeliger, Osnabrueck; Winfried Bunsmann, Bissendorf; Werner Gausmann, Osnabrueck; Siegfried Licher, Georgsmarienhuette; Elmar Breitenbach, Goettingen; Holger Hanselka, Braunschweig; Joerg Melcher, Lehre; Roger Wimmel, Rosdorf-Mengershausen, all of (DE)

(73) Assignee: Wilhelm Karmann GmbH, Osnabrueck (DE)

( * ) Notice: Subject to any disclaimer, the term of this patent is extended or adjusted under 35 U.S.C. 154(b) by 0 days.

(21) Appl. No.: 09/306,246

(22) Filed: May 6, 1999

(30) Foreign Application Priority Data

May 8, 1998 (DE) ............................................. 198 20 617

(51) Int. Cl.[7] ........................... B62D 25/20; B62D 21/10; B62D 27/04
(52) U.S. Cl. ................... 296/204; 296/205; 296/203.02; 296/203.04; 188/267
(58) Field of Search .................................. 296/204, 205, 296/203.01, 203.02, 203.04; 280/781; 188/267; 293/107, 119, 133

(56) References Cited

U.S. PATENT DOCUMENTS

| 3,185,260 | * | 5/1965 | Navarro | 188/267 |
|---|---|---|---|---|
| 4,163,578 | * | 8/1979 | Watson | 296/204 |
| 4,351,515 | * | 9/1982 | Yoshida | 188/267 X |
| 4,411,333 | * | 10/1983 | Bothwell | 180/219 |
| 4,848,525 | * | 7/1989 | Jacot et al. | 188/378 |
| 4,892,328 | * | 1/1990 | Kurtzman | 280/707 |
| 5,074,587 | * | 12/1991 | Schwede | 280/781 |
| 5,577,760 | * | 11/1996 | Pressler | 280/689 |
| 5,775,469 | * | 7/1998 | Kang | 188/267 |

* cited by examiner

Primary Examiner—D. Glenn Dayoan
Assistant Examiner—Patricia Engle
(74) Attorney, Agent, or Firm—Jordan and Hamburg LLP (57) ABSTRACT

A motor vehicle, particularly a convertible, with a vehicle body to which longitudinally moving struts are assigned and with a supporting frame which includes a longitudinally moving strut, is constructed so that at least one of the struts is constructed so that its length can be varied and has assigned to it an absorbing unit for determining a longitudinal stress, a control element for bringing about a counterforce as well as a control unit for the control element.

26 Claims, 6 Drawing Sheets

MOTOR VEHICLE WITH VIBRATION DAMPER

BACKGROUND OF THE INVENTION

The invention relates to a motor vehicle and to a motor vehicle frame with a longitudinal moveable strut.

For land-supported vehicles, especially for convertibles with an integral body and frame which, because of the absence of a roof, are weakened with respect to their stability, but also for frame vehicles, such as motorcycles or vehicles with an aluminum bodies, which are carried by a profiled frame, the problem arises that an external excitation of a vibration, as encountered when driving over an uneven roadway, leads to an excitation of the vibration of the car body. Such vehicle vibrations interfere with driving comfort and safety. In spite of damping elements in the chassis, a transfer of the vibrations to the car body or to the supporting frame cannot be excluded. The car body, especially in the case of a convertible, should therefore be equipped with its own damping elements, which are independent of the chassis and decrease the vibration amplitude of the car body as far as possible within a short response time.

Assigning so-called vibration dampers, that is, damping masses, to the car body structure is well known. These vibration dampers are suitable for damping vibrations of a particular frequency, to which the dampers are tuned. The tuning is possible only for a single frequency. Moreover, adaptation to the respective vehicle type is necessary, the arrangement of the damper in the hollow spaces of the car body or the like being structurally difficult. The dampers themselves have a high mass, which is undesirable with regard to the energetically thrifty operation of the motor vehicle.

SUMMARY OF THE INVENTION

The invention is therefore based on the problem of equipping a motor vehicle body or a motor vehicle frame with a vibration-damping system, which is suitable for acting directly on the car body or on the supporting frame and, in so doing, avoids the disadvantages mentioned above.

Due to the inventive construction of a motor vehicle, the latter can react independently of chassis measures to an external stimulation of the car body to vibrate by varying the length of struts. With that, an adaptive damping system is created, for which an absorbing unit transfers the stresses imposed on a strut and, with that, the amplitude of a stimulating vibration, as a measured value to a control unit, which then acts with a voltage upon a control element, which is located preferably in the strut, whereupon the control element brings about a change in length. A stiffening of the car body or of the frame, to which the respective strut is assigned, goes along with this change in length. The essential parts of the vibration damping device therefore are contained in the respective struts, so that the structural expense of the device as well as its mass are small.

Particularly advantageously, such a strut fulfills a double function, in that, aside from damping vibrations, it additionally develops the function of a stiffening component for an integral body and frame or of a bearing part within a frame of a motor vehicle. Such stiffening components of integral bodies and frames are customary for convertible vehicles and extend, for example, essentially diagonally from the longitudinal edge region of the floor group as far as into a middle region, in order to increase the torsional stiffness in this manner. If such stiffening struts are present the additional mass for achieving an adaptive counter control for vibrations, is minimal. Compared to the usual struts in this region, it is merely necessary to make a division, and the absorbing unit and the control element, which preferably contain pressure-voltage or voltage-pressure converters are then inserted in the middle region.

Pursuant to the invention, the dampers need not be adapted to a respective frequency. Instead, the change in length of the struts can take place at different frequency ranges and is initiated when a minimum stress on the strut is exceeded, that is, by the height of the amplitude of the vibration. Moreover, a response time of the order of milliseconds can be achieved. The deflection, as a reaction to the stress noted between the coupling points of the strut, lies in the millimeter range.

As a control unit, a computer may be used, into which, a reaction optimized to the respective conditions, can be entered by means of a learning program.

Further advantages and distinguishing features arise out of the example of the object of the invention, shown in the accompanying drawings.

DESCRIPTION OF THE PREFERRED EMBODIMENTS

Figure 1:
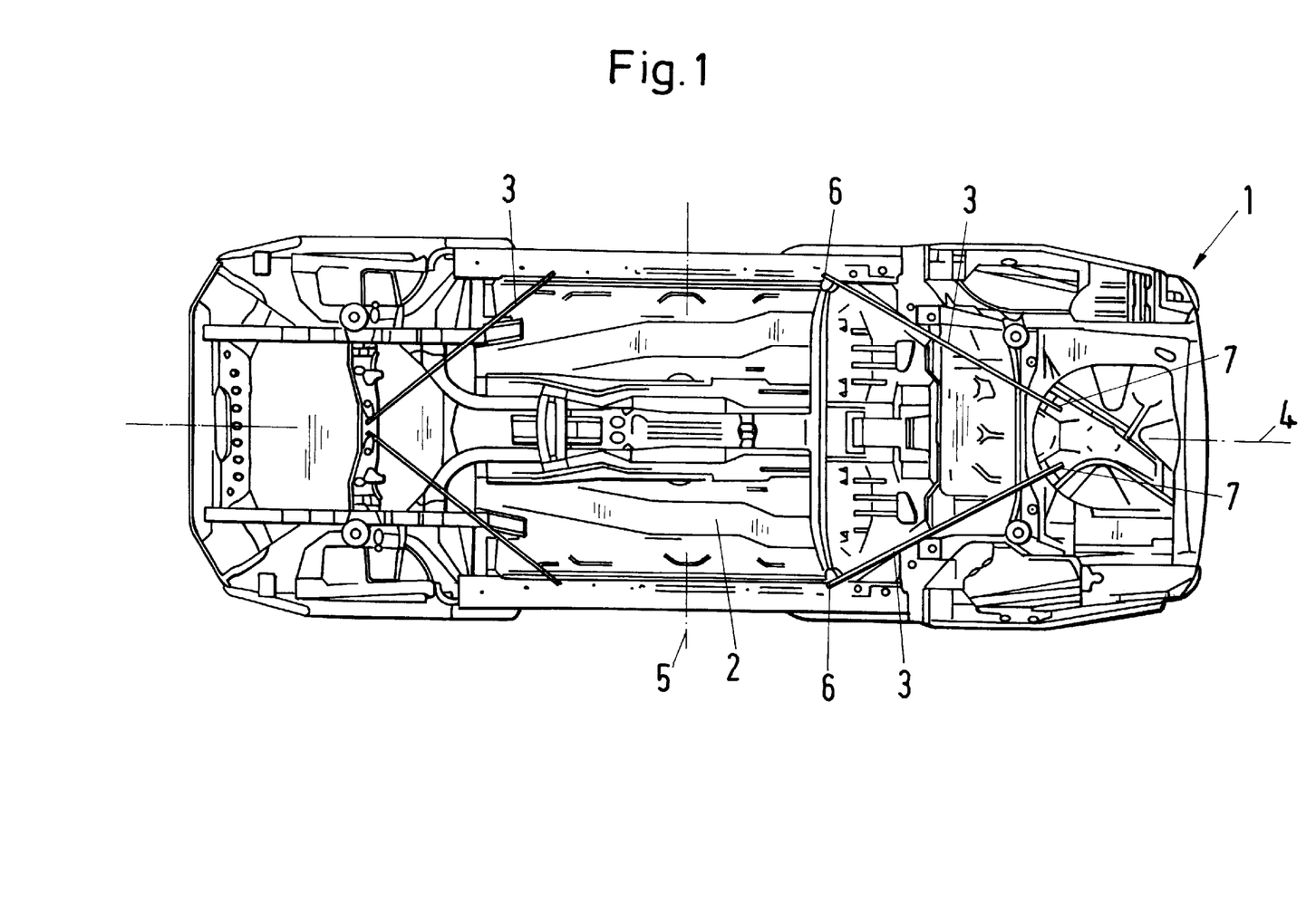
FIG. 1 shows the floor group of an inventive motor vehicle with stiffening struts extending diagonally.

In an example depicted in FIG. 1, a motor vehicle body 1, particularly the body of a convertible vehicle, is provided with struts 3, which are assigned to its floor group 2 and are disposed symmetrically with respect to a vertical longitudinal plane 4 of the vehicle and a vertical transverse center 5 of the vehicle. Such stiffening struts basically are known and are assigned to the floor of the vehicle as profiles formed separately from the car body sheet metal. At their end points 6 and 7, the struts 3 are in each case fixed to the car body 1 in the outer region or in a central region of the floor group 2. For this purpose, the ends 6 and 7 of the struts 3 are flattened flange-like, for example, and have throughholes 8, 9, through which fastening means can be passed. It is also possible to weld the struts 3 to the car body 1 or to attach them in some other way.

Figure 2:
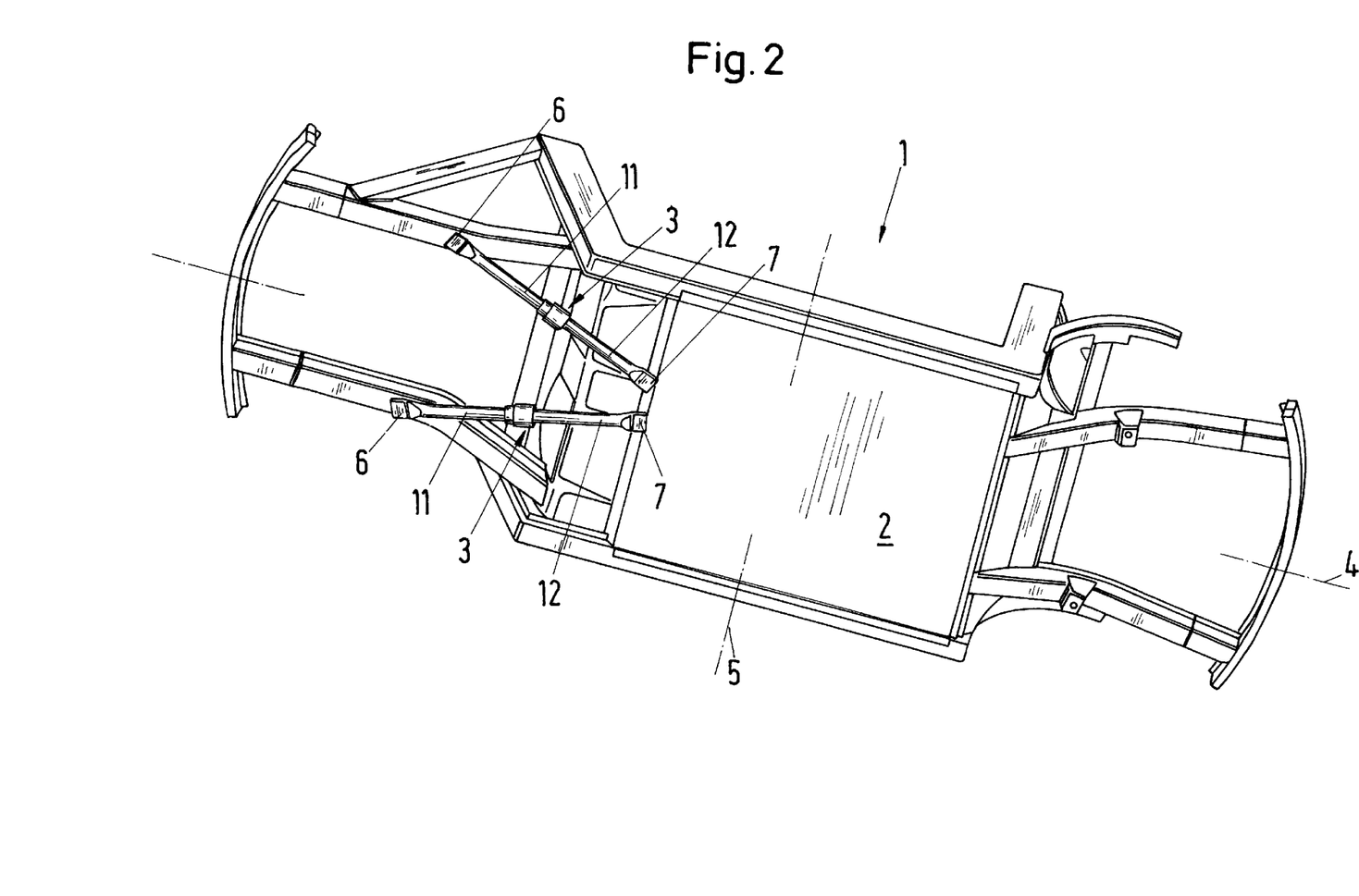
FIG. 2 shows a further floor group of an inventive motor vehicle with an alternative arrangement of stiffening struts.

According to FIG. 2, the arrangement of the struts 3 is such that their inner ends 7, facing the transverse center 5 of the vehicle, run towards one another and the outer ends 6 are assigned to the region of the wheel wells. The strut ends 6 can be fixed to parts of the car body or to the chassis.

The arrangements of the struts 3 with respect to the car body are to be selected so that they counteract twisting of the car body, for example, by means of the diagonal arrangements shown. Furthermore, inventive struts can also be used, for example, as dome struts above the front or rear spring domes, in side barriers or in the region of cross members or roll bars, in order to mention just a few possibilities.

The struts 3 may be integrated in the floor group 2 or in other regions of the car body 1 and do not have to form separate components. If bracing struts of the car body 1 are present, they fulfill a double function when constructed pursuant to the invention. On the one hand, they function as conventional stiffening components. In addition, they fulfill an adaptive vibration damping function and, aside from the passive bracing components, are also active elements affecting the vibrational behavior of the car body 1.

In a further example (not shown), an inventive strut forms part of a tubular frame, which serves as a supporting frame for a passenger car and is formed by a framework of struts. Individual struts of this framework can be replaced by inventive struts, so that the frame, surrounding the passenger space, is not rigid but, as explained in greater detail below, can react to external stimuli leading to vibrations by varying the length of the struts.

Figure 3:
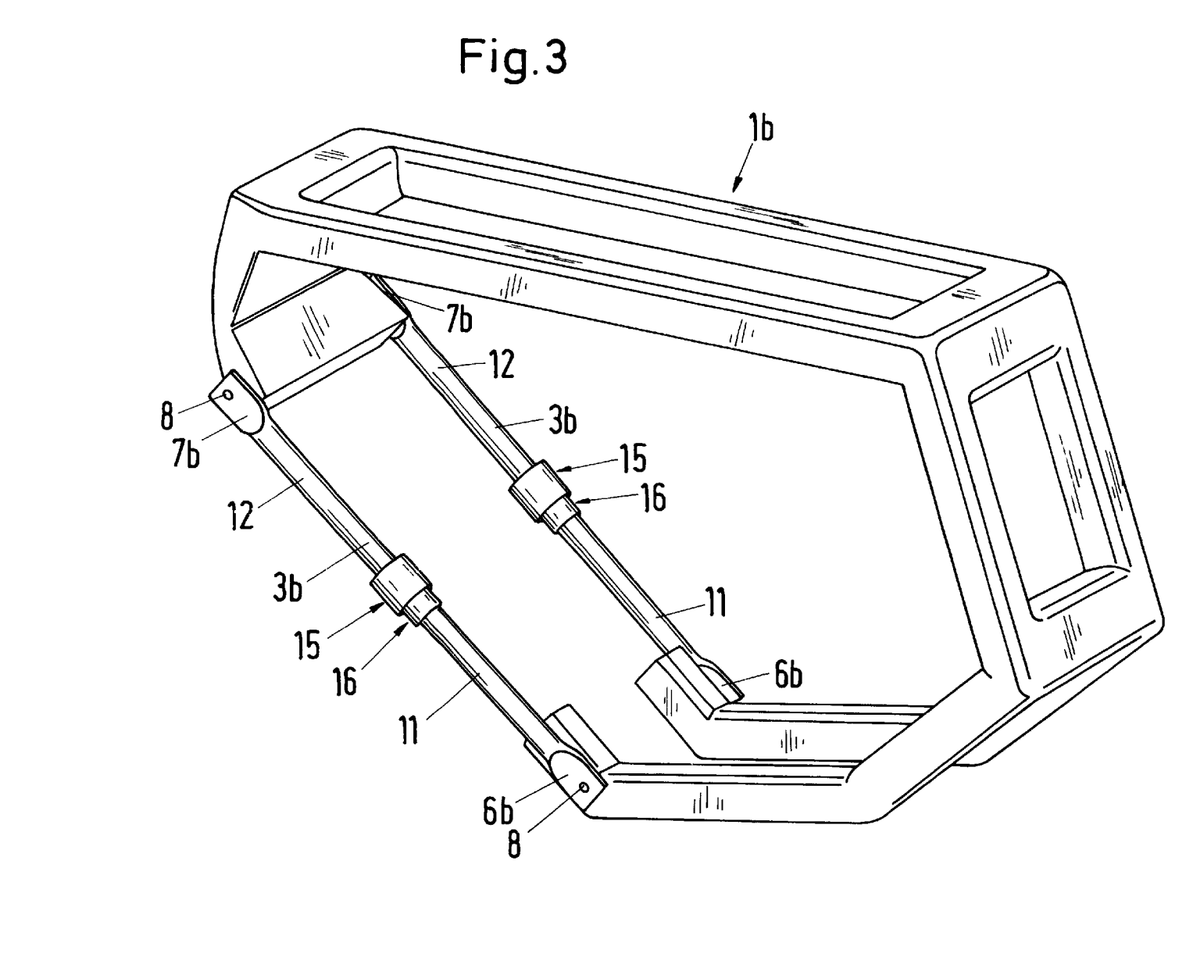
FIG. 3 shows a motorcycle supporting frame, including inventive struts.

In a further example depicted in FIG. 3, the supporting frame 1b of a motorcycle, which is also constructed as a framework supporting frame, is provided with the inventive struts 3b. Especially at high speeds, the danger exists that a rocking motion about the longitudinal axis will arise in the frame of the motorcycle and could build up and lead to an uncontrolled driving behavior and even to a crash. Here also, the stimulation to vibrate can be countered by varying the length of the struts 3b, which therewith bring about a stiffening of the whole of the supporting frame 1b and see to an absorption of the stimulating vibrations.

Figure 4:
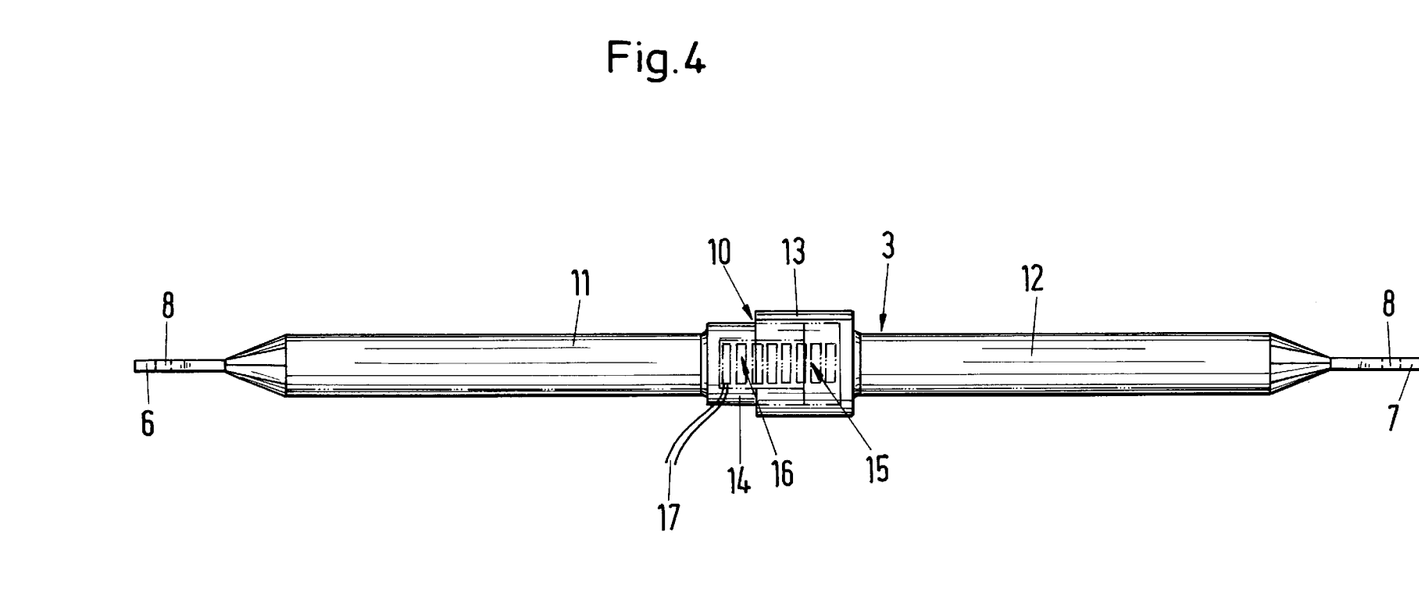
FIG. 4 shows a general view of an inventive strut.
Figure 5:
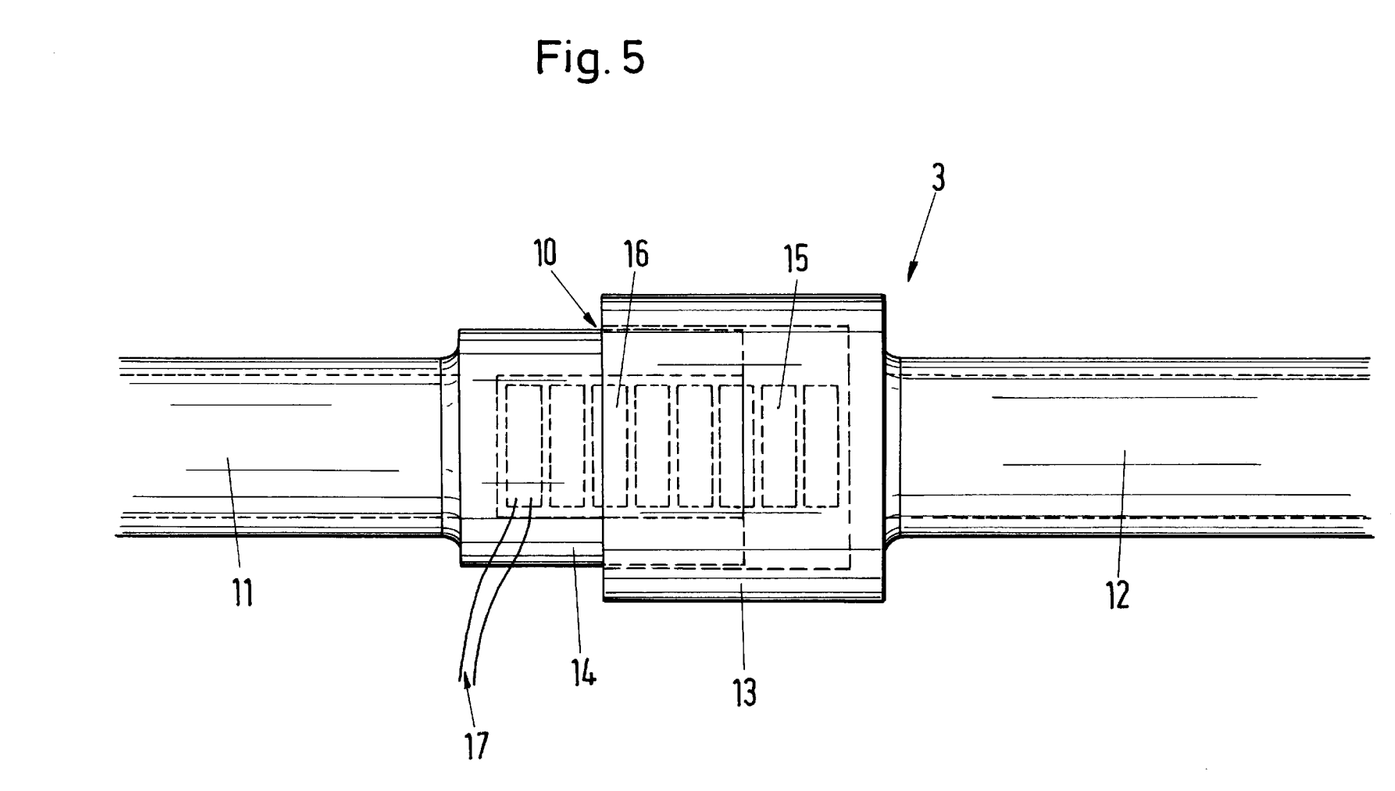
FIG. 5 shows a partial view of interlocking sleeves of the strut.

Inventive struts 3, 3b can be constructed in various shapes, including also angular struts or the like. Pipe-like, box-like or other types of profiles come into consideration. The strut has at least a dividing region 10, at which the strut parts 11, 12 can be shifted relative to one another. In the dividing region 10, an outer sleeve 13 is braced against an inner sleeve 14. In the interior of the interlocking sleeves 13, 14, there is the control element 15 and the absorbing unit 16. With this, the stress on the strut 3, 3b is detected, that is, in particular, a compression or stretching of the strut. This stress is converted into an electrical signal over a pressure-voltage converter of the absorbing unit 16 and the electrical signal is transferred over a control cable 17 to a control unit, which is not shown. From the latter, a control signal goes out in order to influence the control element 15, which may contain a voltage-pressure converter, such as a piezo element, which decreases its internal structure and, with that, its external dimensions in reaction to an input voltage. The control element 15 therefore brings about a variation in length, which acts on the two clamping sleeves 13, 14 and thus moves the parts 11, 12 of the strut 3, which can be shifted with respect to one another, relative to one another.

An increase in the length of the strut is therefore achieved by an increase in the length of the control element 15. Several piezo elements or other voltage-pressure converters can be disposed consecutively in the strut 15 and several pressure-voltage converters can be disposed in the absorbing unit 16.

Components and possibilities for influencing the length, other than the piezo elements, come also into consideration for the absorbing unit 16 or the control element 15.

Figure 6:
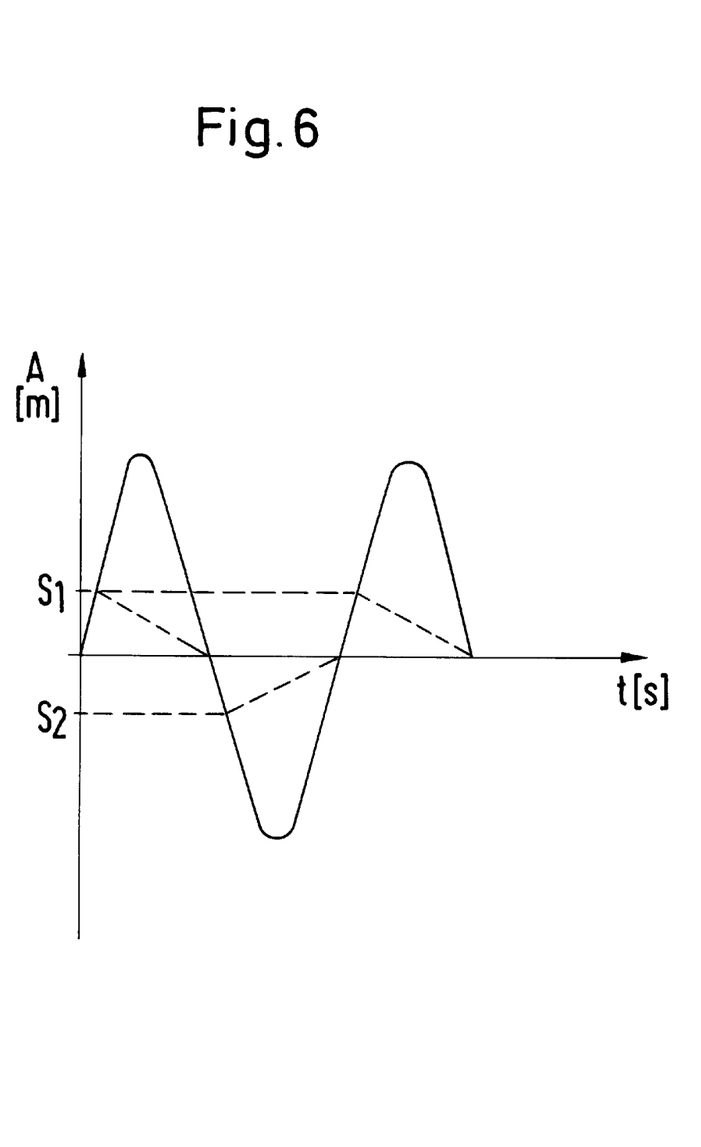
FIG. 6 shows a diagram of the stimulation and damping of vibrations by the inventive struts.

In any case, a stress on the strut 3, as brought about by a twisting of the vehicle, is transferred and detected over its terminal immobilizations at the end of the struts 6 and 7 to the absorbing unit 16 and, from here, a corresponding signal is passed on to the control unit. When a threshold value is exceeded (FIG. 6), this signal triggers the control element 15, which reacts by length changes to the externally stimulating vibration. On the whole, the control element is kept permanently under pressure; the reaction will therefore take place in every case in a greater or lesser stretching of the strut 3. If the threshold value is exceeded, the stimulating vibration, shown in FIG. 6 as a continuous line, is absorbed by stiffening by means of changing the length of the strut 3. After the control element 15 is triggered when a threshold value $S_1$ is reached, the vibration curve, drawn in FIG. 6 as a continuous curve, is returned almost to zero in accordance with the broken line. The corresponding applies for reaching the threshold value at $S_2$. In each case therefore, the vibrations are eliminated almost completely, it being possible to optimize the threshold value and the reaction for different frequencies over a learning program of the control unit. In particular, the low frequency range between 1 Hz and 10 Hz is of interest here. The system works reliably even at higher frequencies up to over 100 Hz. There is no limitation to only certain frequencies. The triggering is accomplished only by the respective amplitude of the vibration; its frequency is variable.

On the whole, pursuant to the invention, a control circuit is formed, which detects, over sensors of the absorbing unit 16, a vibration, which acts in a strut 3 on the vehicle and represents an interfering force and counteracts this interfering force in the sense of an adaptive control, it being possible for the adaptation to take place while a vehicle is travelling. The system is therefore in a position to react to a wide frequency range with a counter force, which in each case obliterates the vibration and merely requires a control unit, which is disposed outside of the struts 3, 3b, as well as sensors of the absorbing unit 16, which are disposed in the strut, and control elements for the control element 15.

What we claim is:

1. A motor vehicle, comprising:

a vehicle body;

longitudinally moving struts attached to the vehicle body, at least one of the struts including structure for permitting a length of said at least one of the struts to be varied;

an absorbing unit for detecting a longitudinal stress in said at least one of the struts;

a control element for providing a counterforce to the longitudinal stress, said counterforce comprising an active force effecting one of an expansion and contraction of the length of said at least one of the struts in response to the longitudinal stress in a form of one of an applied compression force and a pulling force, respectively; and a control unit for influencing the control element in response to the longitudinal stress detected by the absorbing unit.

2. The motor vehicle according to claim 1, wherein the motor vehicle is a convertible.

3. The motor vehicle according to claim 1, wherein said at least one of the struts forms a stiffening component of the vehicle body.

4. The motor vehicle according to claim 3, wherein said at least one of the struts is provided as a component which is separate from sheet metal comprising the vehicle body.

5. The motor vehicle according to claim 1, wherein:

at least two of said struts includes structure for permitting a length thereof to be varied; and said at least two of the struts are arranged symmetrically.

6. The motor vehicle according to claim 1, wherein the absorbing unit includes pressure-voltage converters for producing an electrical signal representative of a value of the longitudinal stress detected stress detected in said at least one of the struts.

7. The motor vehicle according to claim 1, wherein the control element includes a voltage-pressure converter for converting an electrical input signal into a force which acts to vary the length of said at least one of the struts.

8. The motor vehicle according to claim 1, wherein at least one of the absorbing unit and the control element contains a piezo element.

9. A motor vehicle, comprising:

a vehicle body;

longitudinally moving struts attached to the vehicle body, at least two of the struts including structure for permitting a length of said at least one of the struts to be varied, said at least two of the struts being arranged symmetrically, extending from corner regions of the vehicle body up to a central region of a floor of the motor vehicle;

an absorbing unit for detecting a longitudinal stress in said at least one of the struts;

a control element for providing a counterforce to the longitudinal stress; and a control unit for influencing the control element in response to the longitudinal stress detected by the absorbing unit.

10. A motor vehicle comprising:

a vehicle body;

longitudinally moving struts attached to the vehicle body, at least one of the struts including structure for permitting a length of said at least one of the struts to be varied, said at least one of the struts including a multi-part structure presenting one of a tubular and a frame profile, said at least one of the struts being fixed to the vehicle body at both end regions of said at least one of the struts;

an absorbing unit for detecting a longitudinal stress in said at least one of the struts;

a control element for providing a counterforce to the longitudinal stress; and a control unit for influencing the control element in response to the longitudinal stress detected by the absorbing unit.

11. The motor vehicle according to claim 10, wherein:

said at least one of the struts is divided in a centrally located dividing region; and the dividing region includes two interlocking clamping sleeves which correspond to respective strut parts extending on either side of the dividing region.

12. The motor vehicle according to claim 11, wherein the control element is disposed in one of a location within the clamping sleeves and a location within the profile.

13. The motor vehicle according to claim 12, wherein the absorbing unit is located in a position adjacent to the control element.

14. The motor vehicle according to claim 13, wherein measured values of the longitudinal stress detected by the absorbing unit are converted into electrical signals by the control unit for triggering of the control element.

15. The motor vehicle according to claim 14, wherein the control unit is disposed outside of said at least one of the struts.

16. A motor vehicle, comprising:

a supporting frame including at least one longitudinally moving strut including structure for permitting a length of said at least one strut to be varied;

an absorbing unit for detecting a longitudinal stress of said at least one strut;

a control element for providing a counterforce to the longitudinal stress, said counterforce comprising an active force effecting one of an expansion and contraction of the length of said at least one of the struts in response to the longitudinal stress in a form of one of an applied compression force and a pulling force, respectively; and a control unit for influencing the control element in response to the longitudinal stress detected by the absorbing unit.

17. The motor vehicle according to claim 16, wherein said at least one strut includes two struts which are arranged symmetrically.

18. A strut for use in a vehicle, comprising:

a strut body including structure for permitting a length of the strut to be varied, said structure including a multi-part structure divided in a centrally located dividing region into respective strut parts each including structure at ends distant from said dividing region for fixing of the strut body to the vehicle body;

an absorbing unit for detecting a longitudinal stress of the strut body;

a control element for providing a counterforce to the longitudinal stress; and a control unit for influencing the control element in response to the longitudinal stress detected by the absorbing unit.

19. The strut according to claim 18, wherein:

said strut body presents one of a tubular and a frame profile; and said dividing region includes two interlocking clamping sleeves which correspond to respective ones of said strut parts extending on either side of the dividing region.

20. The strut according to claim 19, wherein the control element is disposed in one of a location within the clamping sleeves and a location within the profile.

21. The strut according to claim 20, wherein the absorbing unit is located in a position adjacent to the control element.

22. The strut according to claim 21, wherein measured values of the longitudinal stress detected by the absorbing unit are converted into electrical signals by the control unit for triggering of the control element.

23. The strut according to claim 22, wherein the control unit is disposed outside of the strut body.

24. The strut according to claim 18, wherein the absorbing unit includes pressure-voltage converters for producing an electrical signal representative of a value of the longitudinal stress detected in the strut body.

25. The strut according to claim 18, wherein the control element includes a voltage-pressure converter for converting an electrical input signal into a force acting on the strut parts to induce relative motion between the strut parts.

26. The strut according to claim 18, wherein at least one of the absorbing unit and the control element contains a piezo element.

\* \* \* \* \*